(12) United States Patent
Chou (10) Patent No.: US 9,572,301 B2
(45) Date of Patent: Feb. 21, 2017

(54) SWITCH-FREE MULTI-CUTTING MODE SHEARING TOOL

(71) Applicant: Hwei-Rung Chou, Taipei (TW)

(72) Inventor: Hwei-Rung Chou, Taipei (TW)

(*) Notice: Subject to any disclaimer, the term of this patent is extended or adjusted under 35 U.S.C. 154(b) by 149 days.

(21) Appl. No.: 14/585,200

(22) Filed: Dec. 30, 2014

(65) Prior Publication Data

US 2015/0208589 A1    Jul. 30, 2015

(30) Foreign Application Priority Data

Jan. 28, 2014   (TW) .............................. 103201766 U (51) Int. Cl.
| *B26B 13/00* | (2006.01) |
| *A01G 3/02* | (2006.01) |
| *B26B 13/26* | (2006.01) |
| *B26B 13/28* | (2006.01) |

(52) U.S. Cl.
CPC .............. *A01G 3/021* (2013.01); *B26B 13/26* (2013.01); *B26B 13/285* (2013.01)

(58) Field of Classification Search
CPC ........ A01G 3/021; B26B 13/285; B26B 13/26
USPC .......... 30/254–262, 234, 244, 161–162, 190, 30/192, 249–251
See application file for complete search history.

(56) References Cited

U.S. PATENT DOCUMENTS

| 2,520,905 | A | * | 9/1950 | Borrelli | A01G 3/02 30/237 |
| 3,851,389 | A | * | 12/1974 | Swanson | B23D 29/026 30/250 |
| 4,094,064 | A | * | 6/1978 | Nishikawa | B26B 13/26 30/192 |
| 4,712,653 | A | * | 12/1987 | Franklin | B66F 7/08 108/145 |
| 5,331,742 | A | * | 7/1994 | Schmode | H02G 1/005 30/245 |
| 6,305,087 | B1 | * | 10/2001 | Huang | B23D 21/10 30/188 |
| 6,643,937 | B1 | * | 11/2003 | Wu | A01G 3/02 30/261 |
| 6,938,346 | B1 | * | 9/2005 | Huang | B26B 13/26 30/192 |
| 7,127,819 | B1 | * | 10/2006 | Huang | B23D 21/06 30/251 |
| 7,454,837 | B2 | * | 11/2008 | Shan | A01G 3/02 30/251 |

(Continued)

*Primary Examiner* — Ghassem Alie
*Assistant Examiner* — Bharat C Patel
(74) *Attorney, Agent, or Firm* — Pai Patent & Trademark Law Firm; Chao-Chang David Pai (57) ABSTRACT

A switch-free multi-cutting mode shearing tool includes a shearer including a first handle and a second handle pivotally connected together, a cutter blade pivoted to the first handle, a link pivoted to the second handle, and a pushing element mounted at the second handle. The cutter blade has a cutting edge protruding over a front end of the first handle, an actuation portion projecting between the first and second handles, an elongated slot located in the actuation portion and a plurality of engagement grooves inside the elongated slot. The link has a pin located at a movable end thereof and inserted into and movable along the elongated slot and selectively engageable into one of the engagement grooves, such that when the first and second handles are closed toward each other, the pushing element is forced to touch and push the actuation portion of the cutter blade.

3 Claims, 10 Drawing Sheets

(56) References Cited

U.S. PATENT DOCUMENTS

| | | | |
|---|---|---|---|
| 8,726,523 B2* | 5/2014 | Wang | A01G 3/0251 30/245 |
| 9,066,473 B2* | 6/2015 | Podlesny | A01G 3/021 |
| 2002/0000044 A1* | 1/2002 | Huang | A01G 3/02 30/250 |
| 2008/0184567 A1* | 8/2008 | Jou | B26B 13/22 30/262 |
| 2009/0090010 A1* | 4/2009 | Lin | B26B 29/04 30/254 |
| 2009/0223059 A1* | 9/2009 | Yu Chen | B26B 13/26 30/92 |
| 2010/0139100 A1* | 6/2010 | Mortensen | B26B 17/02 30/92 |
| 2012/0047750 A1* | 3/2012 | Maag | A01G 3/02 30/251 |
| 2013/0031786 A1* | 2/2013 | Wang | A01G 3/021 30/251 |
| 2014/0053413 A1* | 2/2014 | Huang | A01G 3/0251 30/250 |

\* cited by examiner

SWITCH-FREE MULTI-CUTTING MODE SHEARING TOOL

BACKGROUND OF THE INVENTION (a) Field of the Invention

The present invention relates to shearing tool technology, and more particularly to a switch-free multi-cutting mode shearing tool, which allows the user to shear branches through one of multiple cutting modes.

(b) Description of the Prior Art

Figure 1:
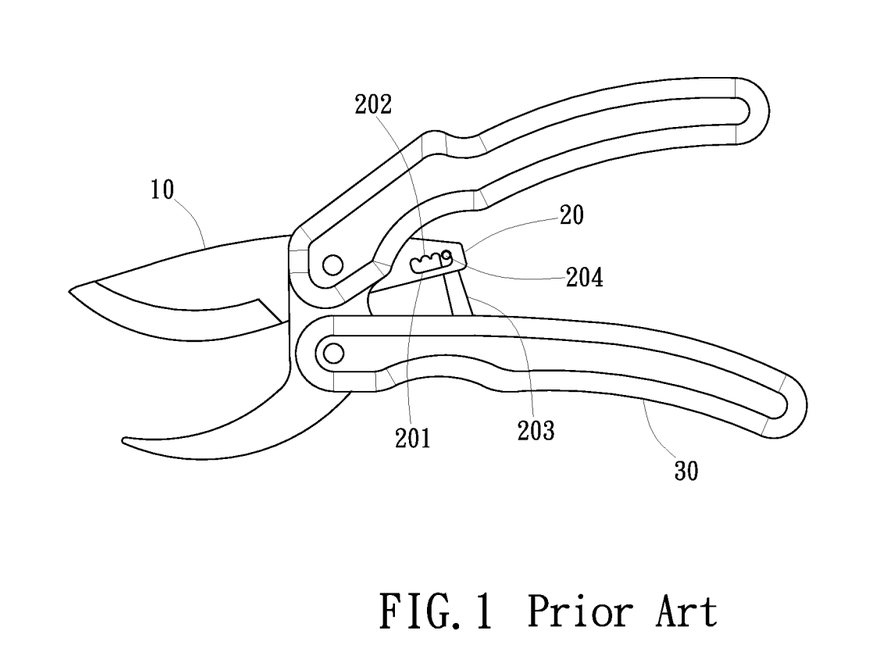
FIG. 1 is a schematic front view of pruning shears according to the prior art.
Figure 2:
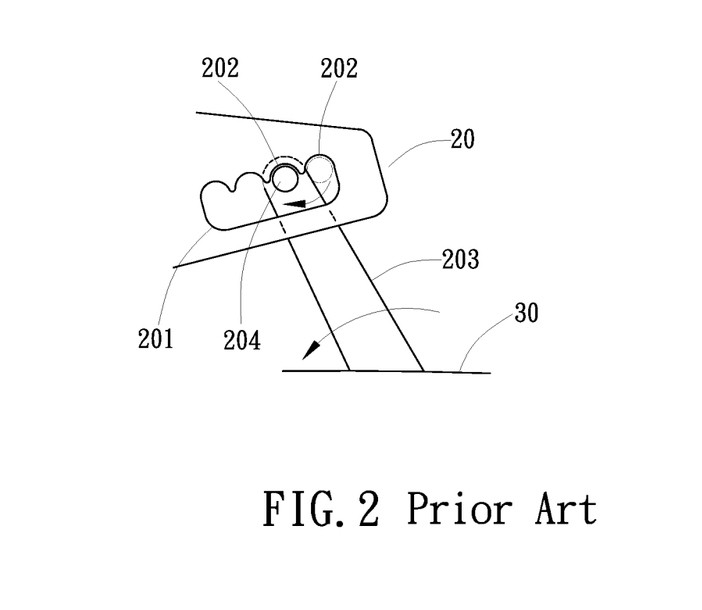
FIG. 2 is a schematic applied view of the pruning shears according to the prior art.

Many short pruning shears (gardening shears) for use in gardening to prone branches of trees and shrubs are known and seen in U.S. Pat. Nos. 2,520,905, 3,851,389 and 4,094,064. In U.S. Pat. No. 4,094,064, as illustrated in FIG. 1, the pruning shears comprise a labor-saving structure 20 located at a rear end of a cutter blade 10 thereof. This labor-saving structure 20 comprises an elongated slot 201 located near the rear end of the cutter blade 10, a series of engagement grooves 202 located at a top side inside the elongated slot 201, and a lever 203 having one end pivotally connected to the elongated slot 201. The lever 203 has a pin 204 located at the pivotally connected end and selectively movably engageable in one of the engagement grooves 202 in the elongated slot 201. The other end of the lever 203 is pivoted to one handle 30. When pruning a branch of a tree, the lever 203 can be moved with the handle 30 to engage the pin 204 into the last engagement groove 202 in the elongated slot 201. Thus, the user can apply a force through the pin 204 to the engaged engagement groove 202, forcing the cutter blade 10 to cut into the branch with less effort. If the grip force applied by the user is insufficient, the user can release the handle 30 slightly, enabling the pin 204 to be shifted to another engagement groove 202 (see FIG. 2), and then press the handle 30 to move the lever 203 again, forcing the pin 204 against the newly engaged engagement groove 202 to further force the cutter blade 10 into the branch. Thus, the user must repeatedly press and release the labor-saving structure-equipped pruning shears so as to cut off the branch. This design of pruning shears simply provides one single operating mode.

When using pruning shears to shear a thin branch of a tree, the pruning shears should be able to cut off the thin branch through one cut. However, due to the design of the aforesaid labor-saving structure 20, the user is urged to employ a segmented force operating mode. Some other improved designs are then developed as seen in U.S.20120047750, U.S.20130031786 and EP2637493. According to these designs, a movable element is provided for enabling the pruning shears to provide two operating modes. This movable element is adapted for stopping against the cutter blade or the lever at a selected location. When the user manually switch the movable element to stop at the rear end of the cutter blade, the pruning shears enter a single-stage cutting mode, and the user can cut off the branch with the pruning shears through one single cut. If the movable element is moved away from the cutter blade, the cutter blade is returned to the multi-stage cutting mode as shown in the aforesaid FIG. 1 and FIG. 2.

However, when using the pruning shears that provide two cutting modes, the user must select the desired cutting mode prior to pruning the branches, however, the user cannot easily determine which cutting mode to be selected, for example, when pruning a branch having a diameter about 1 mm, the user may be unable to decide which cutting mode is better. Further, different branches of different trees have different hardness (for example, a 2 mm diameter dry branch and a 2 mm diameter plant stem have different hardness), in this case, the user will be unable to decide which cutting mode should be employed. More particularly, if the user cannot cut off the branch using the single-stage cutting mode, the user cannot directly shift the pruning shears from the single-stage cutting mode to the multi-stage cutting mode. At this time, the user must remove the pruning shears from the branch, and then shift the pruning shears from the single-stage cutting mode to the multi-stage cutting mode, and then attach the pruning shears to the branch again to cut off the branch. Although these dual cutting mode pruning shears allow the user to selectively use the single-stage cutting mode or multi-stage cutting mode, it is still not satisfactory in function.

SUMMARY OF THE INVENTION

The present invention has been accomplished under the circumstances in view. It is therefore the main object of the present invention to provide a switch-free multi-cutting mode shearing tool, which is practical for shearing branches of different thicknesses selectively through a single-stage cutting mode or multi-stage cutting mode, allowing the user to change between the cutting modes conveniently without any switching operation.

To achieve this and other objects of the present invention, the multi-cutting mode shearing tool comprises a shearer and a pushing element. The shearer comprises a first handle and a second handle pivotally connected together, a cutter blade pivotally connected to the first handle, and a link pivotally connected to the second handle. The cutter blade comprises a cutting edge protruding over a front end of the first handle, an actuation portion projecting into a space between the first handle and the second handle, an elongated slot located in the actuation portion, a plurality of engagement grooves located in a slot wall of the elongated slot, and a bearing edge located at one side of the actuation portion and facing toward the second handle. The link comprises a movable end, and a pin located at the movable end and inserted into and movable along the elongated slot and selectively engageable into one of the engagement grooves. The pushing element is mounted at the second handle facing the first handle, adapted for touching and moving the bearing edge of the actuation portion of the cutter blade when the first handle and the second handle are moved toward each by a user.

When shearing a branch, the user can press the first and second handles with one hand to force the link against the actuation portion of the cutter blade, causing the cutting edge of the cutter blade to cut off the branch through one cut. When squeezing the first and second handles with one hand to cut a relatively thicker branch and to force the cutting edge into a part of the branch, the bearing edge of the actuation portion will be stopped at the pushing element. At this time, the user who has a relatively larger grip force can squeeze the first and second handles again to force the pushing element against the bearing edge of the actuation portion, driving the cutting edge to cut off the branch. For a user having a relatively smaller grip force, the user needs not to remove the cutter blade of the shearer from the branch. At this time, the user can slightly release the second handle, enabling the pin to be moved along the elongated slot into another engagement groove, and then, the user can squeeze the first and second handles again, using the leverage of the link to impart a pressure to the actuation portion, forcing the cutting edge to cut off the branch. Thus, the invention provides a single-stage cutting mode and a multi-stage cutting mode, and allows the user to change the cutting mod without any switching operation.

Other advantages and features of the present invention will be fully understood by reference to the following specification in conjunction with the accompanying drawings, in which like reference signs denote like components of the tool.

DETAILED DESCRIPTION OF THE PREFERRED EMBODIMENTS

Figure 3:
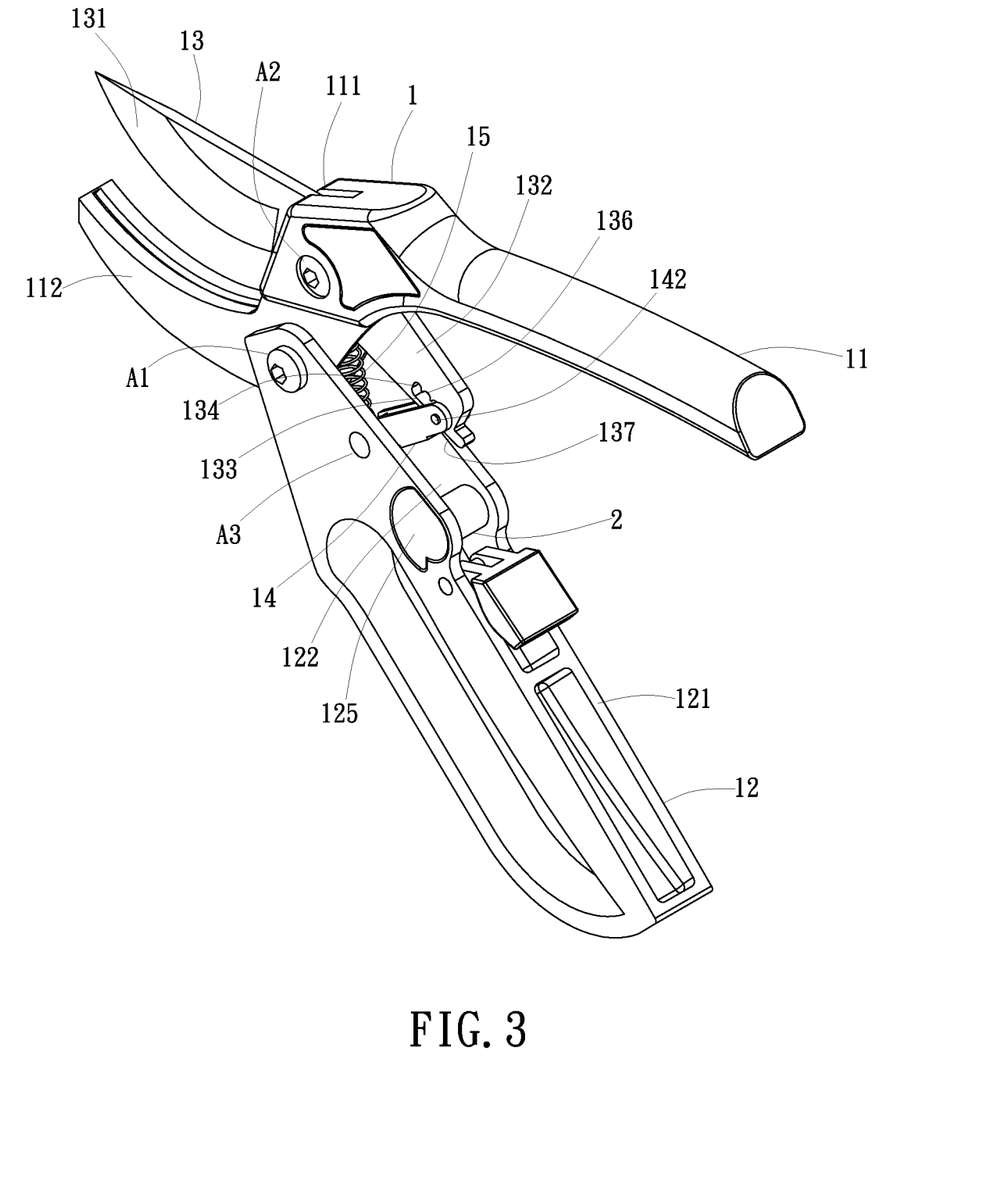
FIG. 3 is an oblique top elevational view of a switch-free multi-cutting mode shearing tool in accordance with the present invention.
Figure 4:
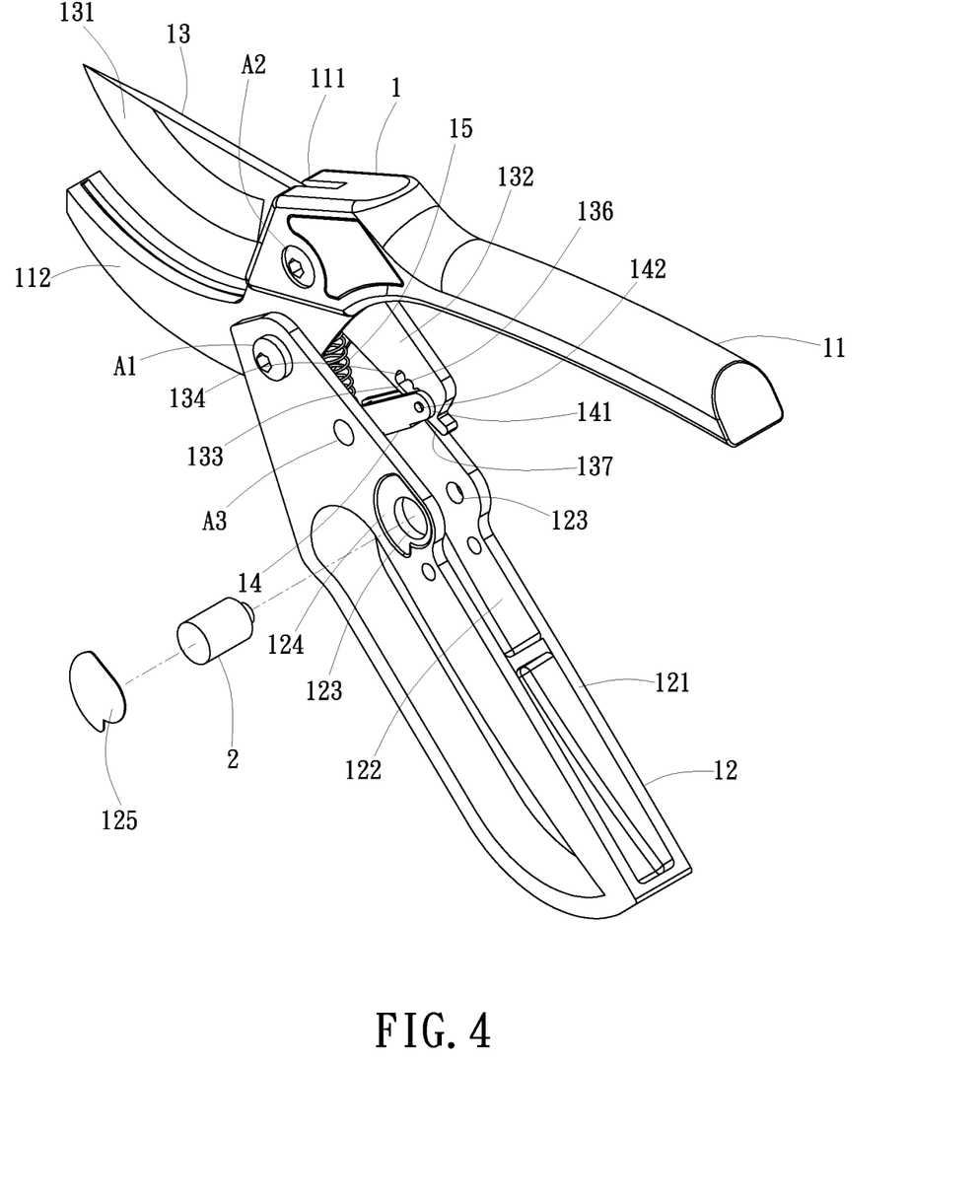
FIG. 4 is an exploded view of the switch-free multi-cutting mode shearing tool in accordance with the present invention.

Referring to FIGS. 3 and 4, a switch-free multi-cutting mode shearing tool in accordance with the present invention is shown. The switch-free multi-cutting mode shearing tool comprises a shearer 1, and a pushing element 2.

The shearer 1 comprises a first handle 11 and a second handle 12 pivotally connected together. The first and second handles 11,12 have respective front ends thereof joined together by a first pivot joint A1, and thus, the first and second handles 11,12 can be opened and closed. A cutter blade 13 is pivotally connected to the first handle 11 by a second pivot joint A2. Thus, the cutter blade 13 can be biased relative to the first handle 11. A link 14 is pivotally connected to the second handle 12 by a third pivot joint A3. The link 14 has a movable end 141 (see FIG. 4 and FIG. 5) facing toward the first handle 11.

Figure 5:
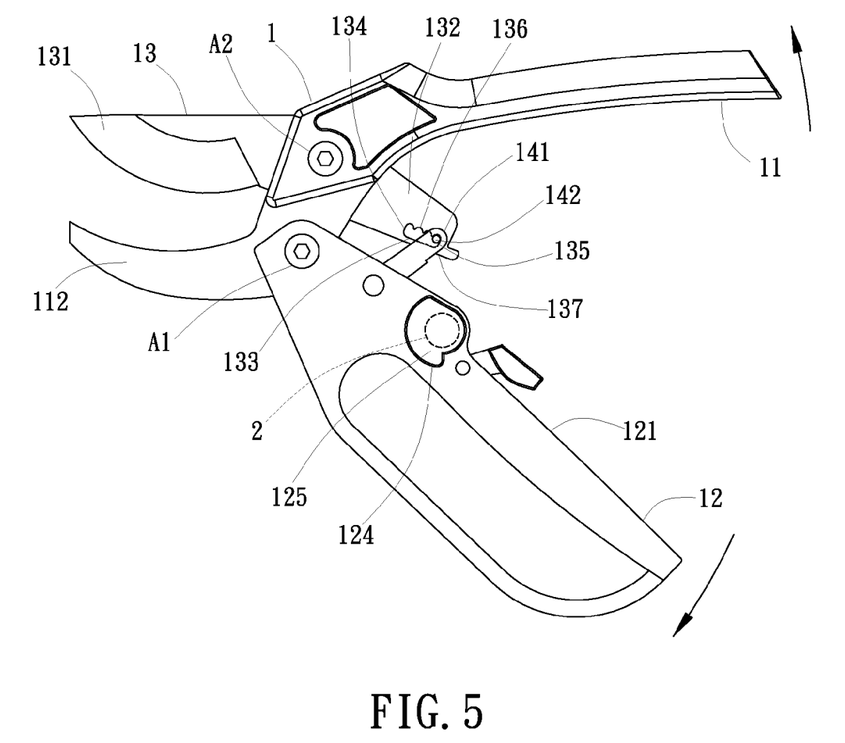
FIG. 5 is a schematic drawing illustrating an opened status of the switch-free multi-cutting mode shearing tool in accordance with the present invention.

As illustrated in FIG. 4 and FIG. 5, the cutter blade 13 comprises a cutting edge 131 protruding over the front end 111 of the first handle 11, an actuation portion 132 projecting into the space between the first handle 11 and the second handle 12, and an elongated slot 133 transversely cut through the actuation portion 132. The elongated slot 133 has a first end 134 and a second end 135. The first end 134 is disposed adjacent to the cutting edge 131. The second end 135 is disposed remote from the cutting edge 131. Further, multiple engagement grooves 136 are located in a slot wall of the elongated slot 133. These engagement grooves 136 are semicircular grooves. Further, the actuation portion 132 defines a bearing edge 137 facing toward the second handle 12. Applying a pressure to the engagement groove 136 or the bearing edge 137 can cause the cutting edge 131 to abut against an anvil portion 112 at the front end of the first handle 11, thereby cutting off tree branches.

Figure 6:
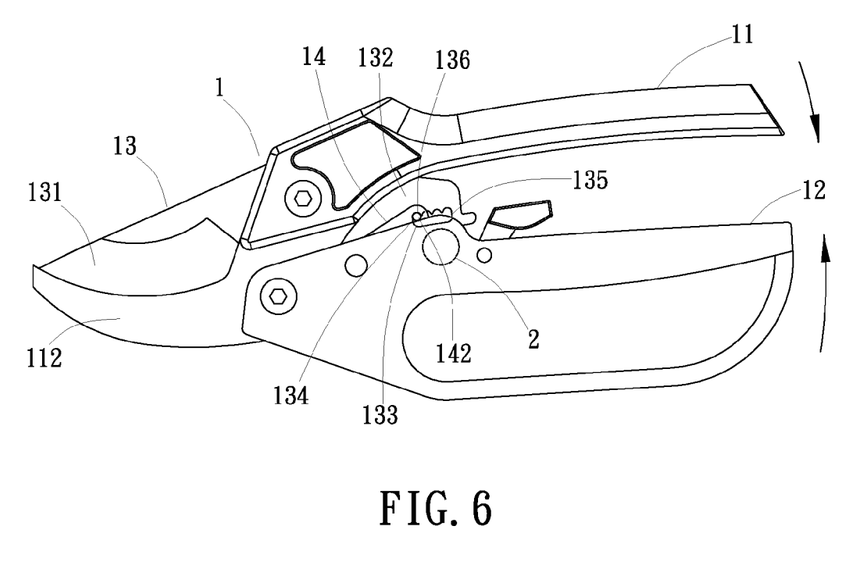
FIG. 6 is a schematic drawing illustrating a closed status of the switch-free multi-cutting mode shearing tool in accordance with the present invention.

Referring to FIGS. 4 and 5 again, a pin 142 is transversely disposed in the movable end 141 of the link 14. The pin 142 is inserted into the elongated slot 133 and movable between the first end 134 and the second end 135 of the elongated slot 133, and selectively engageable into one of the engagement grooves 136. Preferably, the shearer 1 further comprises a spring member 15. The spring member 15 is preferably mounted in the second handle 12 to impart a pressure to the link 14. Thus, as shown in FIG. 5, when opening the first and second handles 11,12 of the shearer 1, the pin 142 of the link 14 is moved toward the second end 135 of the elongated slot 133 till that the pin 142 is stopped at the second end 135. Further, as shown in FIG. 6, when closing the first and second handles 11,12 of the shearer 1, the pin 142 of the link 14 is moved toward the first end 134 of the elongated slot 133 till that the pin 142 is stopped at the first end 134.

As illustrated in FIG. 3 through FIG. 5, the pushing element 2 is preferably a cylinder mounted at the second handle 12 facing the first handle 11. When moving the first and second handles 11,12 toward each other (closing the shearer 1), the pushing element 2 must be able to touch and push the bearing edge 137 of the actuation portion 132 of the cutter blade 13. Preferably, the second handle 12 further comprises a recessed chamber 122 located in an inner side 121 thereof facing the first handle 11, and a hole 123 transversely cut therethrough across the recessed chamber 122. The pushing element 2 (cylinder) is mounted in the hole 123 and disposed in the recessed chamber 122. The second handle 12 further comprises a recessed portion 124 located in at least one of two opposite lateral sides thereof. The foresaid hole 123 is located in the recessed portion 124. After installation of the pushing element 2 (cylinder) in the hole 123, an ornamental pad 125 is bonded to the recessed portion 124 to keep the pushing element 2 from sight.

Figure 7A:
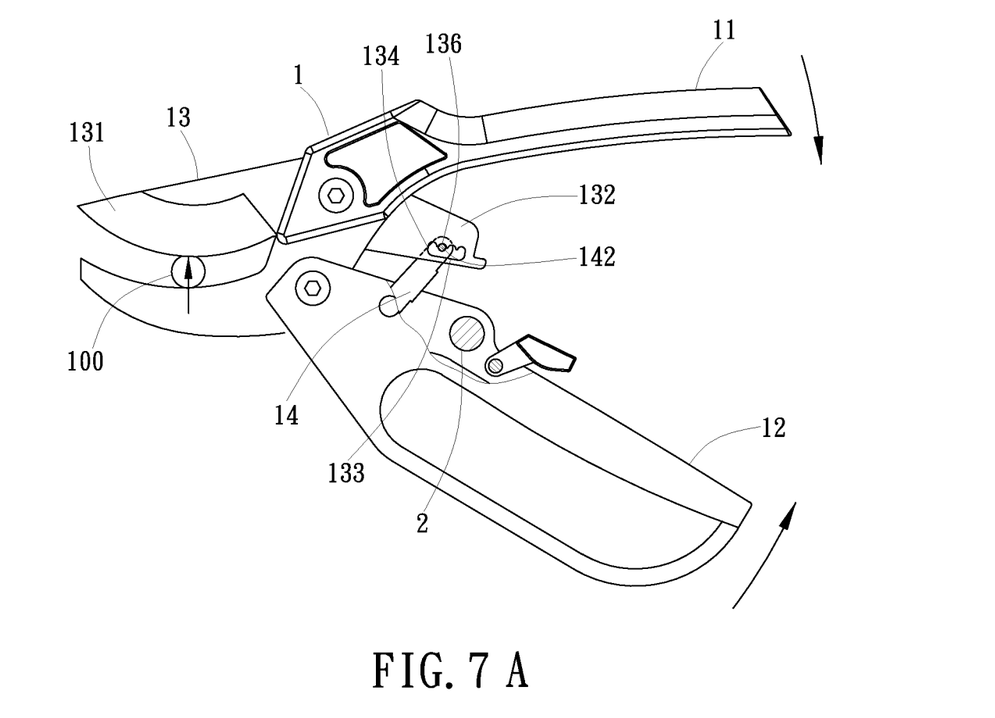
FIGS. 7A through 7B are schematic drawings illustrating a one-cut pruning mode of the switch-free multi-cutting mode shearing tool in accordance with the present invention.
Figure 7B:
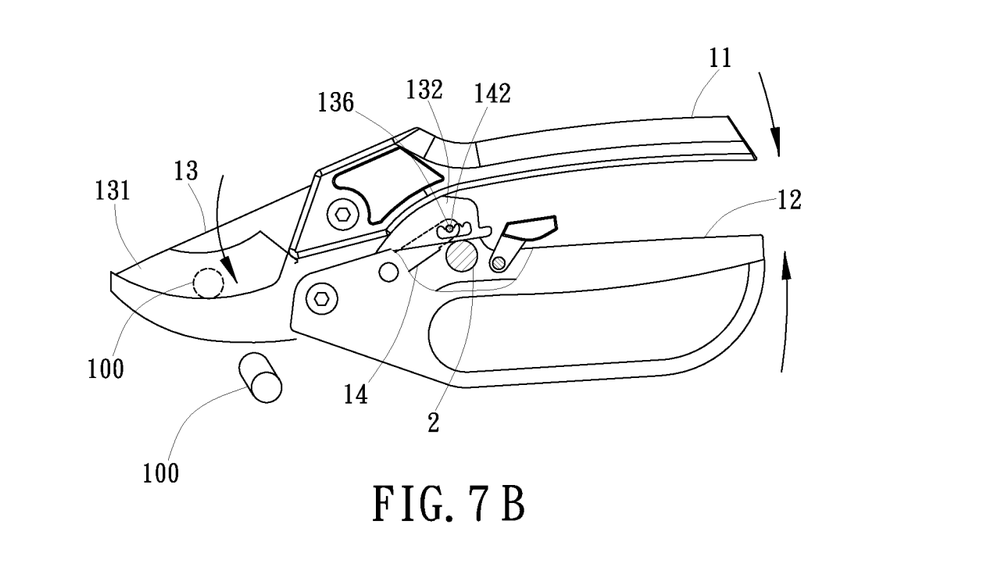

When using the multi-cutting mode shearing tool, use a single-stage cutoff mode to trim smaller branches, as shown in FIG. 7A. When pressing the first and second handles 11,12 toward each other, the pin 142 of the link 14 is moved along the elongated slot 133 toward the first end 134 till that the cutting edge 131 of the cutter blade 13 touches the branch 100. At this time, the counterforce of the branch 100 is acted upon the cutting edge 131, and the actuation portion 132 is turned downwards, causing the first or second engagement groove 236 near the first end 134 to be forced into engagement with the pin 142. As illustrated in FIG. 7B, when the user keeps squeezing the first and second handles 11,12 the link 14 will be further forced by the second handle 12, driving the pin 142 to move the engaged engagement groove 136 and the actuation portion 132, and thus the cutting edge 131 can cut off the branch 100 in one action.

Figure 8A:
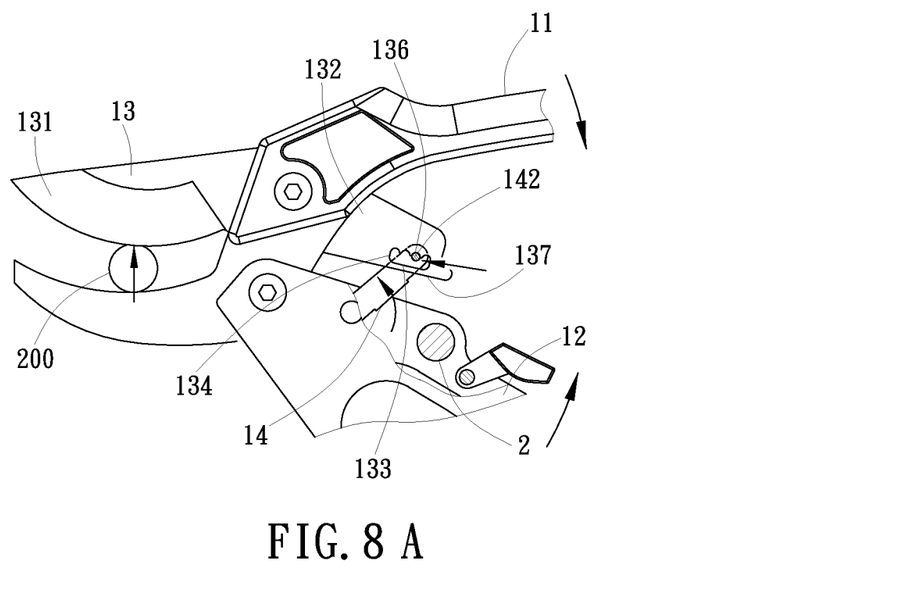
FIGS. 8A through 8C are schematic drawings illustrating a one-cut pruning mode of the switch-free multi-cutting mode shearing tool in accordance with the present invention.
Figure 8B:
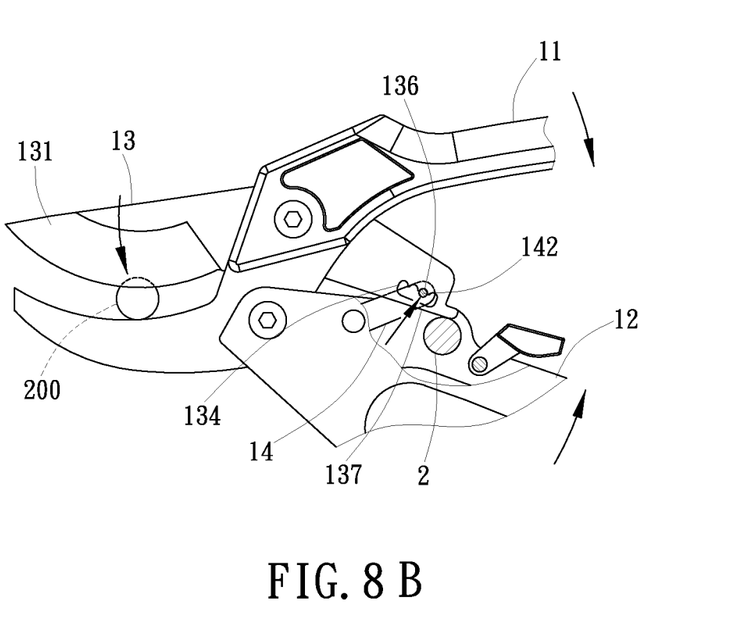

The shearing tool according to the present invention allows a person having a relatively larger grip force to trim a medium thickness branch using the one-stage cut-off mode. As illustrated in FIG. 8A, when the user holds and squeezes the first and second handles 11,12, the pin 142 of the link 14 is moved along the elongated slot 133 toward the first end 134. Because the medium thickness branch 200 has a relatively larger diameter, the cutting edge 131 will touch the branch 200 more quickly than the situation shown in FIG. 7A. When the cutting edge 131 touches the branch 200, the branch 200 immediately gives a counterforce to the cutting edge 131, and the movement of the pin 142 can be stopped at the third engagement groove 136 from the first end 134. At this time, the actuation portion 132 is turned downwards, causing the pin 142 to be engaged into this third engagement groove 136. As illustrated in FIG. 8B, when the user keeps squeezing the first and second handles 11,12, the link 14 will be further forced by the second handle 12, driving the pin 142 to move the engaged third engagement groove 136 and the actuation portion 132, and thus the cutting edge 131 can cut into the branch 100 to the extent that the bearing edge 137 of the actuation portion 132 is stopped at the pushing element 2.

Figure 8C:
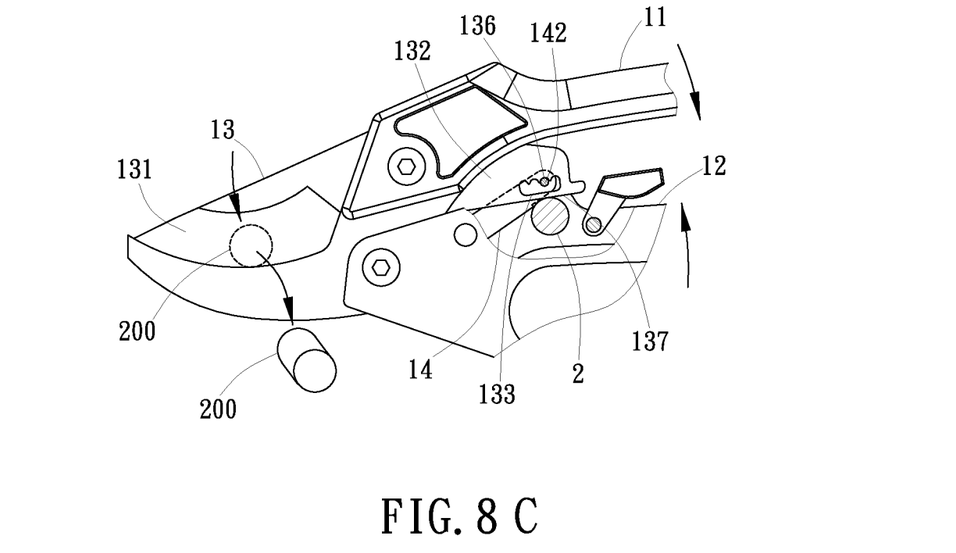

Further, as shown in FIG. 8C, the user who has a relatively larger grip force can apply more force at this time, forcing the pushing element 2 to move the bearing edge 137 and the actuation portion 132, and thus, the cutting edge 131 at the front end of the first handle 11 can cut off the medium thickness branch 200. Thus, it can be seen that, by means of the design of the present invention, for a person capable of giving a relatively larger grip force or for a branch 200 having a relatively larger diameter with relatively lower hardness, the shearing tool can be operated to cut off the branch through one cut, making the pruning work efficiently.

Figure 8D:
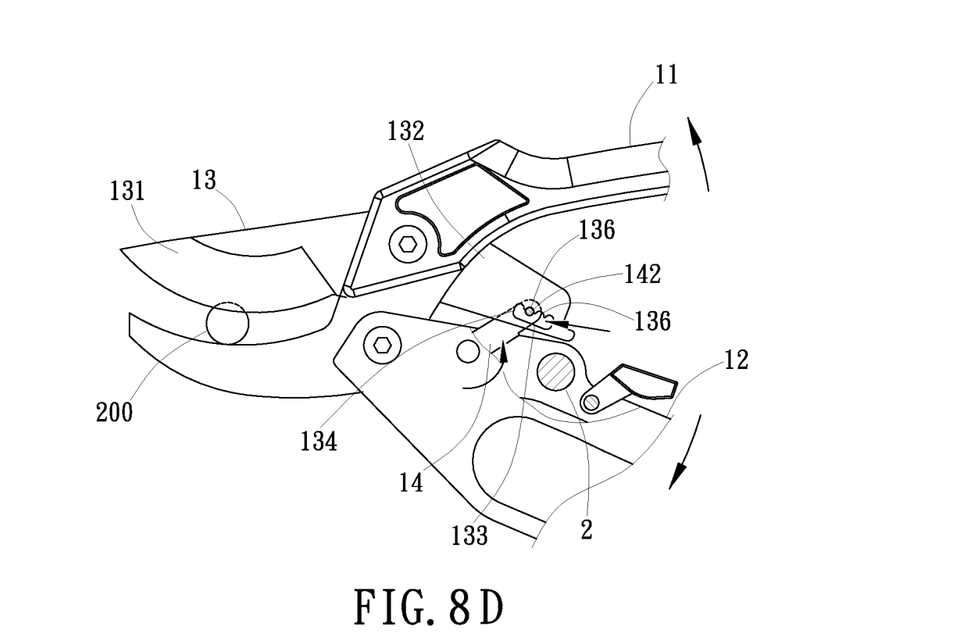
FIGS. 8D through 8E are schematic drawings illustrating a multi-cut pruning mode of the switch-free multi-cutting mode shearing tool in accordance with the present invention for cutting a medium-diameter branch.
Figure 8E:
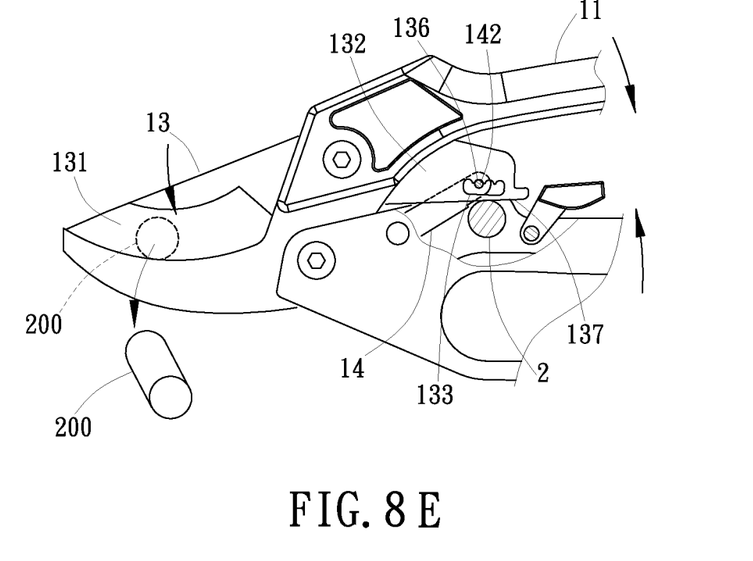

On the contrary, as shown in FIG. 8D, for a user having a relatively smaller grip force, the user can slightly release the second handle 12 at this time, to carry the pin 142 of the link 14 away from the third engagement groove 136, so that the link 14 and the pin 142 can be moved toward the first end 134 by the force of the spring member 15 and the pin 142 can then be engaged into the second engagement groove 136. Thereafter, as shown in FIG. 8E, the user having a relatively smaller grip force can squeeze the first and second handles 11,12 again. At this time, the link 14 will be further forced by the second handle 12, driving the pin 142 to move the engaged third engagement groove 136 and the actuation portion 132, and thus the cutting edge 131 can cut off the branch 200. Thus, for a user having a relatively smaller grip force, or for a branch 200 having a relatively larger diameter with less hardness, the user can directly operate the shearer 1 in the above-described manner to cut off the branch 200 efficiently without the need of opening the shearer 1 to switch the operating mode.

Figure 9:
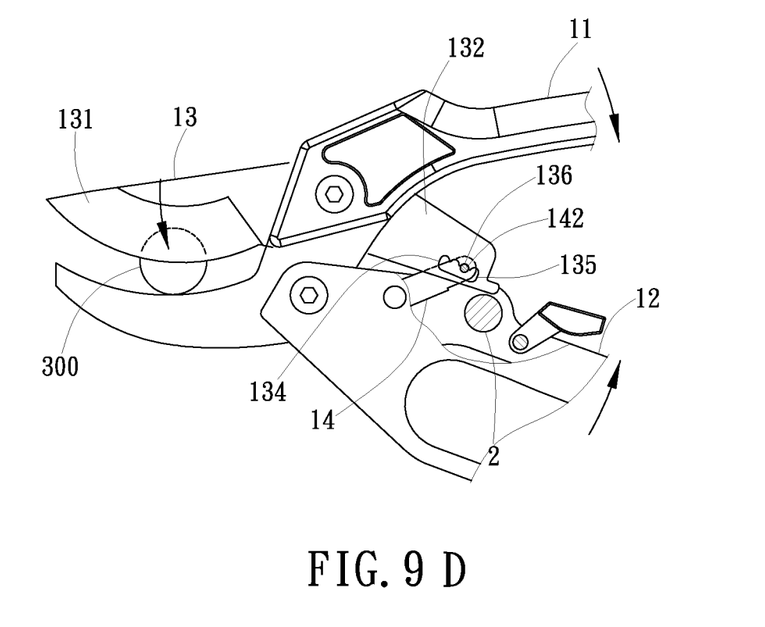
FIGS. 9A through 9E are schematic drawings illustrating a multi-cut pruning mode of the switch-free multi-cutting mode shearing tool in accordance with the present invention for cutting a large-diameter branch.
Figure 9A:
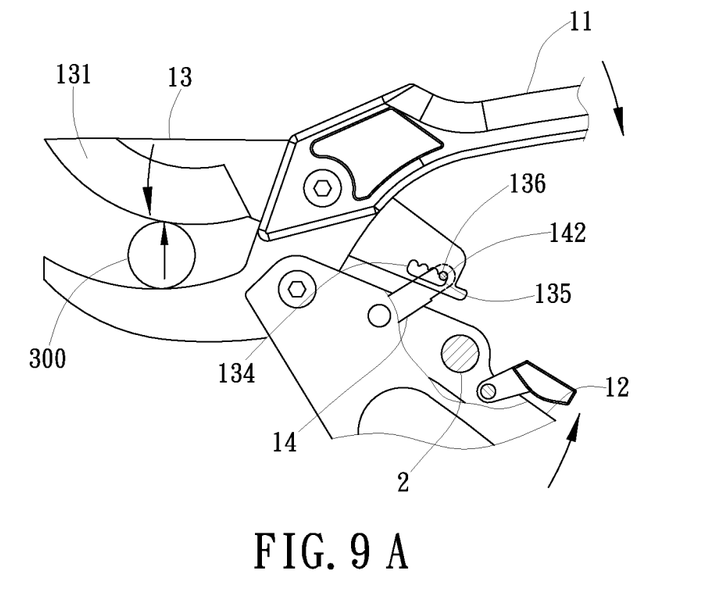
Figure 9B:
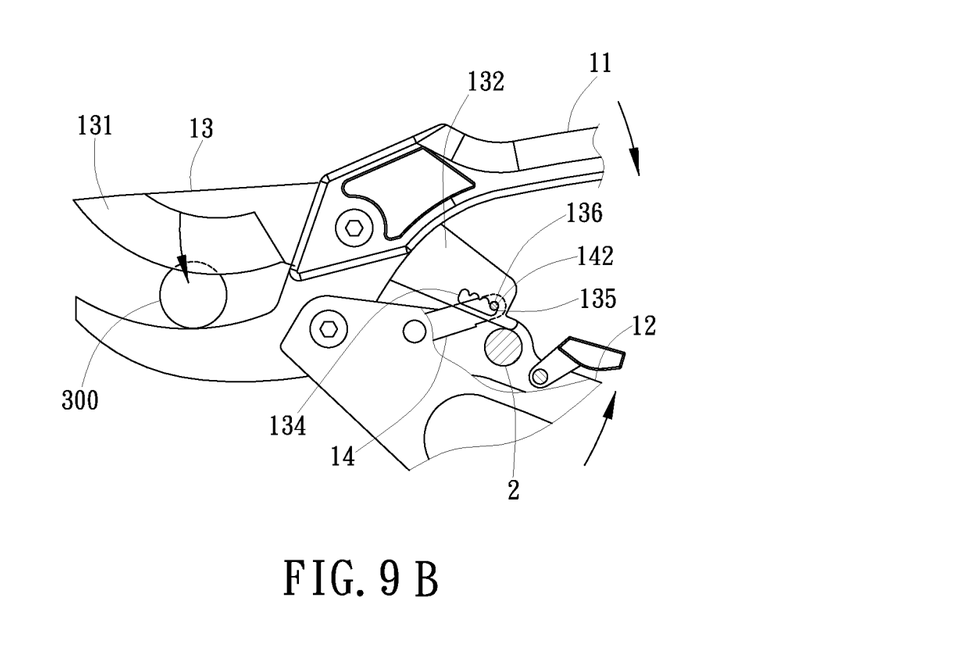
Figure 9C:
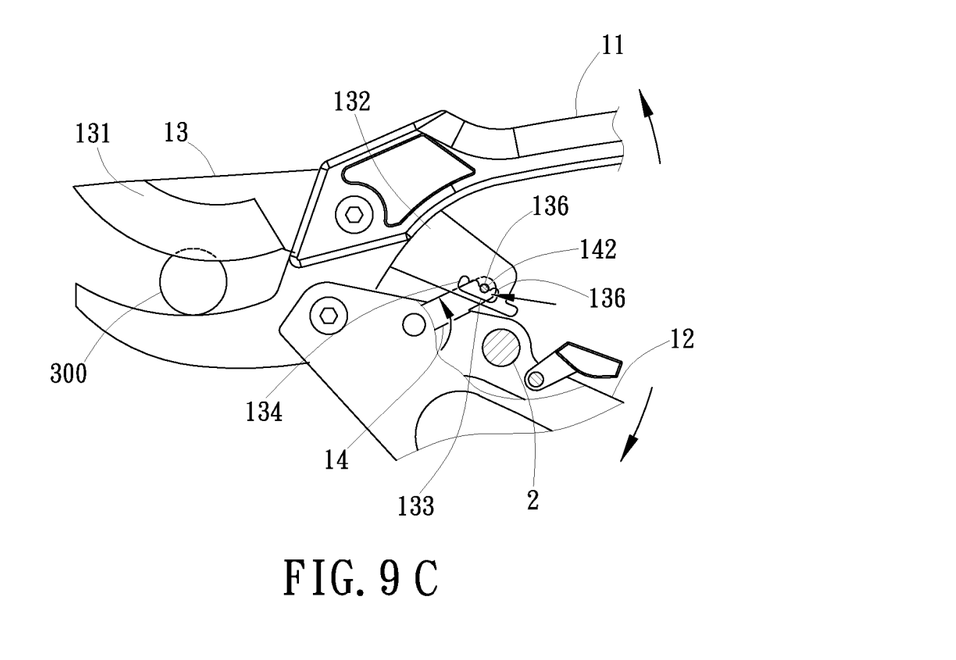

Similarly, as shown in FIG. 9A, when pruning a thick branch 300, the thick branch 300 will soon give a counterforce to the cutting edge 131 of the cutter blade 13, causing the pin 12 of the link 14 to be engaged into the fourth engagement groove 136 away from the first end 134 at the initial stage, and thus, as shown in FIG. 9B, the cutting edge 131 can cut into the branch 300 slightly. Thereafter, as shown in FIG. 9C, slightly release the second handle 12 to carry the pin 142 of the link 14 to the third engagement groove 136. Thereafter, as shown in FIG. 9D, press the second handle 12 again to the pin 142 to move the engaged third engagement groove 136 and the actuation portion 132, forcing the cutting edge 131 into the branch 200 deeper. Thus, the pin 142 can be shifted to the first engagement groove 136 adjacent to the first end 134 when repeatedly releasing and pressing the second handle 12 of the shearer 1, as shown in FIG. 9E, enabling the thick branch 300 to be completely cut off.

When compared to the prior art pruning shears, the design of the cylindrical pushing element 2 enables a user having a relatively larger grip force to cut off a branch in one or two cuts, or a user having a relatively smaller grip force to cut off a branch through by means of repeatedly loosing and then pressing the handles of the shearer 1. The shearing tool of the present application can be designed to provide up to four engagement grooves 136 for performing a cutting operation in a maximum of four stages. The number of stages of the cutting operation to be employed is determined according to the grip force of the user and the hardness and diameter of the branch. Thus, a user can conveniently operate the shearing tool of the present invention to cut off branches through one cut or a series of cuts Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A switch-free multi-cutting mode shearing tool, comprising:
a shearer comprising a first handle and a second handle pivotally connected together, a cutter blade pivotally connected to said first handle, and a link pivotally connected to said second handle, said cutter blade comprising a cutting edge protruding over a front end of said first handle, an actuation portion projecting into a space between said first handle and said second handle, an elongated slot located in said actuation portion and having a first end adjacent to said cutting edge and a second end remote from the cutting edge, a plurality of engagement grooves located in a slot wall of said elongated slot, and a bearing edge located at one outer peripheral side of said actuation portion and facing toward said second handle, said link comprising a movable end and a pin located at said movable end and inserted into and movable along said elongated slot and selectively engageable into one said engagement groove;
a spring member adapted to impart a pressure to said link for pushing said pin of said link toward the first end of the elongated slot and
a pushing element fixedly mounted at said second handle facing said first handle, said pushing element adapted for directly touching and moving said bearing edge of said actuation portion of said cutter blade when said first handle and said second handle are moved toward each other,
wherein, when the shearer is opened, said pin of said link is moved along said elongated slot toward said second end till said pin is stopped at said second end of said elongated slot;
when the shearer is closed, said pin of said link is moved along said elongated slot toward said first end till said pin is stopped at said first end of said elongated slot; and
when said bearing edge of said actuation portion of said cutter blade touches said pushing element, further moving said first handle and said second handle toward each other causes said cutting edge of said cutter blade to abut toward the front end of said first handle, and
wherein, during a cutting action, releasing said second handle relative to said first handle to a certain extent will allow said pin of said link to be carried from one of said engagement grooves toward another closer to said first end of said elongated slot, so that a multi-stage cutting may be achieved.

2. The switch-free multi-cutting mode shearing tool as claimed in claim 1, wherein said pushing element is a cylinder.

3. The switch-free multi-cutting mode shearing tool as claimed in claim 2, wherein said second handle further comprises a recessed chamber located on an inner side thereof facing said first handle, and a hole transversely cut therethrough across said recessed chamber; and said pushing element is mounted in said hole of said second handle.

* * * * *